(No Model.)
C. P. FINEGAN.
PLOW.
No. 463,624. Patented Nov. 24, 1891.
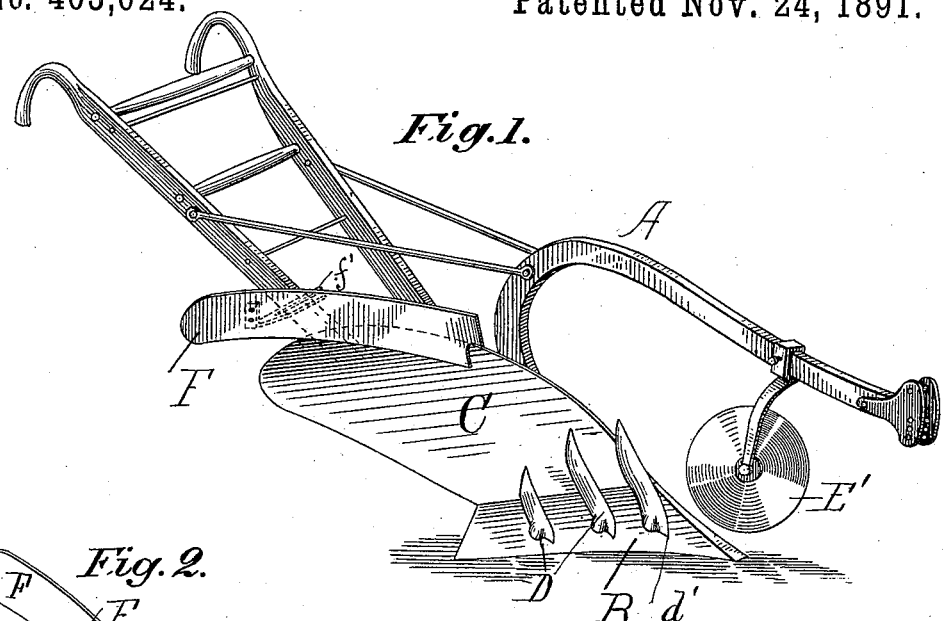
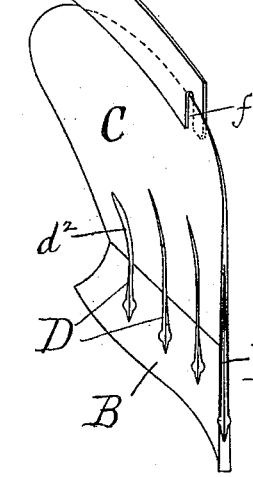
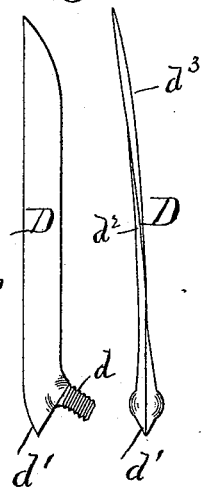
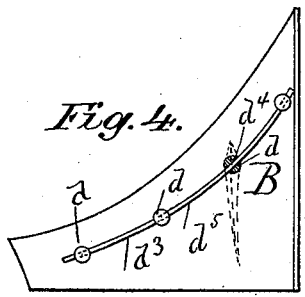
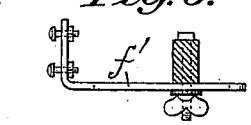
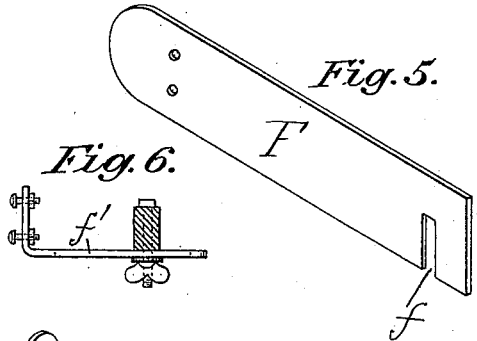
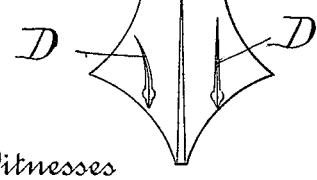
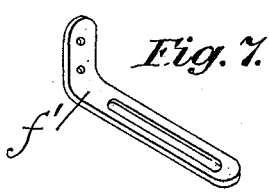
Witnesses
H. W. Munday
Emma Hack
Inventor
Christopher P. Finegan
By his Attorneys
Munday Evarts & Adcock

UNITED STATES PATENT OFFICE.

CHRISTOPHER P. FINEGAN, OF CHICAGO, ILLINOIS.

PLOW.

SPECIFICATION forming part of Letters Patent No. 463,624, dated November 24, 1891.

Application filed June 6, 1890. Serial No. 354,497. (No model.)

*To all whom it may concern:*

Be it known that I, CHRISTOPHER P. FINEGAN, a citizen of the United States, residing in Chicago, in the county of Cook and State of Illinois, have invented a new and useful Improvement in Plows, of which the following is a specification.

My invention relates to improvements in plows, and more especially to plows used for turning sod or other hard or tough soil requiring tearing, cutting, or subdivision.

In plowing sod the furrows are usually turned a foot or more in width, and if the sod is tough a great deal of subsequent labor or harrowing is necessary in order to tear apart and subdivide the sod and get the ground in condition for planting, owing to the fact that the sod or furrows turned are in such large pieces as to be very firm and solid, and thus offer great resistance to its disintegration. The breaking-plow heretofore in use for turning the sod also has to twist it, and this requires great force, especially where the furrow is wide and the sod tough or strong, and the force required in this twisting operation materially increases the draft of the plow.

The object of my invention is to provide a means whereby the sod or other furrow may be cut or divided longitudinally into narrow strips as it is turned, to the end that the resistance offered by the twisting of a wide sod or furrow may be obviated and that no large heavy pieces of sod may be left by the plow requiring to be pulverized or torn apart by harrowing.

My invention consists in a plow combined with a series of cutters or colters for dividing the furrow turned by the plow longitudinally into a number of separate strips.

It further consists in making these cutters or coulters in the form of upwardly and backwardly projecting knives attached to the upper surface of the plow, and preferably near its cutting-edge, so that the pressure or force of the sod or furrow against the cutters necessary to sever the sod will itself serve to diminish the pressure and friction of the sod against the surface of the plow.

It further consists in making the upwardly and backwardly projecting cutters of a twisted and curved form approximately corresponding to the shape and path of the sod or furrow in its passage along the mold-board or surface of the plow as the plow advances through the soil. The twist and curvature of the cutter-blades will depend somewhat upon the shape of the shear and mold-board or surface of the plow. One good way which I have practiced of ascertaining the proper shape for the cutter-blades is to make them out of a comparatively flexible or yielding metal or steel sheet or blade, attach them to the plow, and then put the plow in use, when the sod or furrow itself will operate to twist and curve the thin cutter-blades into the proper shape. From such blades so made and curved others of a stronger and permanent character may then be readily fashioned.

Another feature of my invention consists in combining with the plow colter-blades pivotally attached to its surface or shear, so that the blades may automatically adjust themselves in direction to the proper line of the sod or furrow as it is turned and so that they may yield if they come in contact with any hard obstruction. By employing colters or cutters which project upward and backward from the surface of the plow the cutters operate upon the soft under surface of the furrow or sod and from below, and their action is such as to cause or permit the narrow strips in which the sod is severed to divide or part away from the knives, and thus materially diminish the friction upon the surface of the plow and also upon the sides of the knives themselves. If straight colters or rolling colters which act from above and press down upon the soil were used in practicing my invention, they would of course serve to divide the soil into narrow strips; but they would materially tend to increase the pressure and friction both upon the surface of the plow as well as upon themselves. By attaching the upwardly and rearwardly projecting cutter-blades near the cutting-edge of the plow they serve to divide the sod into narrow strips before any twisting action takes place, and the force required to twist a wide sod is thus entirely saved by my invention. As the sod is divided into narrow strips a comparatively small amount of subsequent harrowing will serve to tear it apart and put it in good condition for planting. The division of the sod into narrow strips also materially facilitates the destruction and disintegration of the sod by the drying and other actions of the atmosphere and weather.

My invention also consists in the novel devices and novel combinations of parts and devices herein shown and described, and more particularly pointed out in the claims.

In the accompanying drawings, which form a part of this specification, and in which similar letters of reference indicate like parts, Figure 1 is a perspective view of a plow embodying my invention. Fig. 2 is a front view. Fig. 3 are detail views of one of the cutter-blades. Fig. 4 is a bottom view showing the means for preventing the reversal of the pivotal cutter-blades. Fig. 5 is a detail view of the attachment for the mold-board. Figs. 6 and 7 are detailed views of the bracket, and Fig. 8 illustrates the application of the invention to a cultivator-shovel.

In the drawings, A represents a breaking-plow. B is the plowshare; C, the mold-board, and D D are the cutters or colters. The colters or cutters consist, preferably, of upwardly and backwardly projecting cutter-blades attached to the share of the plow near its cutting-edge.

E is the cutter or colter which divides the furrows from the landside. This cutter may preferably be an upwardly and backwardly projecting blade attached to the share or point of the plow, as shown in Fig. 2, though, if desired, a rolling colter E′, as shown in Fig. 1, may be employed to sever the sod or furrow from the land. Each of the cutters D is furnished with a screw-threaded shank $d$, by which it is attached to the share B. Each of the cutters D is also furnished with a curved nose or point $d'$, projecting in front of its shank $d$. Each of the cutter-blades is also given a curve $d^2$ and preferably a twist $d^3$ to conform to the path or shape of the sod or furrow as it is turned from the plow. The particular form and shape of this curve and twist will, however, be somewhat different for each of the cutters D, according to the particular location of each on the share.

The cutter E, as shown in Fig. 2, is of precisely the same construction as the cutters D, excepting that it has no twist or lateral curvature.

F is a supplemental mold-board or plate attached, preferably, near the upper edge of the mold-board C for the purpose of turning, directing, or deflecting the sod nearest the landside under the other portion thereof to make a smoother furrow. This supplemental mold-board F may preferably be furnished with a slot $f$ and a bracket $f'$ for attaching the same to the plow, the bracket being slotted to permit adjustment of the angle of the supplemental board to the mold-board.

The number of cutters D may be varied as desired. On very narrow plows one or two may be sufficient, and on very wide ones four or five, or more, may be used to advantage.

To prevent the pivoted cutter-blades from reversing, I provide the pivot-shank $d$ thereof with holes or slots $d^4$, through which a wire or key $d^5$ may be inserted. This wire or key will prevent the pivoted cutters from making more than a quarter-turn or from reversing, while at the same time it permits them to freely turn on their pivots sufficiently to automatically adjust their direction to the path of the sod or furrow.

It will be understood that I do not claim, broadly, a cutter or colter for dividing the furrow from the land, as such cutters or colters, whether stationary or rolling, have long been in common use. I do, however, claim the colter E, pivotally secured to the shear or point of the plow.

I claim—

1. The combination, with a mold-board or breaking plow, of a laterally curved and twisted cutter-blade secured to its shear near the cutting-edge thereof and projecting upwardly and backwardly therefrom to divide the furrow turned by the plow into separate strips forward of the place where the furrow is twisted, the curved and twisted shape of said cutter-blade conforming to the line or path of the furrow as it is turned at the point where it is divided by the cutter-blade, so that the cutter-blade will offer the least resistance to the passage of the furrow and not prevent the scouring of the plow or obstruct the draft, substantially as set forth.

2. The combination, in a mold-board plow, of mold-board C with shear B and a series of pivotal cutter-blades D, having pivot-shanks $d$ and nose $d'$, said pivot-shanks extending transversely through said shear and said cutter-blades projecting upwardly and backwardly and being twisted and curved to conform in shape to the path of the furrow at the point where it is divided by each cutter-blade, respectively, said pivot-shanks $d$ being slotted and having a common fastening-wire $d^3$ inserted through them to hold them in place and at the same time allow a limited pivotal movement of each cutter, substantially as specified.

3. The combination, with mold-board C, of shear B and two or more cutter-blades D, having slotted pivot-shanks $d$ extending transversely through said shear and furnished with a fastening-key $d^3$ to limit the pivotal movement of said cutter-blades and prevent their reversal, substantially as specified.

4. The combination, with a breaking-plow, of a number of cutter-blades secured to its shear forward of the place where the sod is twisted and projecting upwardly and backwardly from said shear, said cutter-blades each being curved and twisted to conform to the shape and path of the furrow at the particular point where each divides the furrow, so that they will not obstruct the scouring or draft of the plow, said cutters also being secured to the shear by pivots extending transversely through the shear, so that they may swing laterally and independently and automatically adjust themselves to the line of least resistance, substantially as specified.

CHRISTOPHER P. FINEGAN.

Witnesses:
H. M. MUNDAY,
EMMA HACK.